United States Patent

Smith et al.

[11] Patent Number: 6,085,290
[45] Date of Patent: Jul. 4, 2000

[54] METHOD OF AND APPARATUS FOR VALIDATING DATA READ OUT OF A MULTI PORT INTERNALLY CACHED DYNAMIC RANDOM ACCESS MEMORY (AMPIC DRAM)

[75] Inventors: Douglas E. Smith, Westford; Richard F. Conlin, Franklin, both of Mass.

[73] Assignee: Nexabit Networks, LLC

[21] Appl. No.: 09/038,720

[22] Filed: Mar. 10, 1998

[51] Int. Cl.[7] .............................. G06F 12/00; G06F 13/00
[52] U.S. Cl. ............................ 711/131; 711/117; 710/56
[58] Field of Search .................................. 711/131, 117, 711/1; 714/767; 395/876

[56] References Cited

U.S. PATENT DOCUMENTS

| | | | |
|---|---|---|---|
| 3,832,684 | 8/1974 | Besenfelder | 714/814 |
| 3,872,431 | 3/1975 | Besenfelder et al. | 341/94 |
| 5,142,541 | 8/1992 | Kim et al. | 714/764 |
| 5,490,112 | 2/1996 | Hush et al. | 365/189.04 |
| 5,799,209 | 8/1998 | Chatter | 710/56 |
| 5,835,941 | 11/1998 | Pawlowski | 711/117 |

*Primary Examiner*—Behzad James Peikari
*Assistant Examiner*—Brian R. Peugh
*Attorney, Agent, or Firm*—Rines and Rines

[57] ABSTRACT

An apparatus for and method of enhancing the performance of a multi-port internal cached DRAM (AMPIC DRAM) by providing an internal method of data validation within the AMPIC memories themselves to guarantee that only valid requested data is returned from them, or properly marked invalid data. A modified technique for identifying bad data that has been read out of AMPIC memory devices in the system.

8 Claims, 8 Drawing Sheets

METHOD OF AND APPARATUS FOR VALIDATING DATA READ OUT OF A MULTI PORT INTERNALLY CACHED DYNAMIC RANDOM ACCESS MEMORY (AMPIC DRAM)

The present invention relates to the validation of data to be read at a DRAM bank prior to such being read, to insure that it is current and up-to-date data, being more particularly, though not exclusively, directed to such validation of data read out of a multi-port internally cached DRAM memory system of the type described in co-pending U.S. patent application Ser. No. 581,467, filed Dec. 29, 1995, for High Performance Universal Multi Port Internally Cached Dynamic Random Access Memory System, Architecture and Method, by Mukesh Chatter now U.S. Pat. No. 5,799, 209, and of common assignee herewith, and to the ability to optimize the performance of such a device with a minimal amount of complexity.

BACKGROUND

In multi-ported internally cached dynamically accessed memory systems (AMPIC devices)—a new paradigm in shared memory core switching described in said co-pending application and hereinafter more fully explained,— independent serial interface cache data is written into the AMPIC device before writing it into shared internal DRAM banks, over which contention arises. The caching of the data received on the serial interfaces reduces the chances that internal contention to a particular DRAM bank will affect the overall external performance of the serial interfaces by increasing the number of requests that may be outstanding to a particular internal AMPIC DRAM bank before it becomes necessary to stop the writing of information on one of the external serial interfaces in order to avoid overrunning the limited write cache space for the particular serial interface. Because of the potential for a large number of read and write access requests to be contending for a particular DRAM bank, the time it takes the AMPIC device to write data into one of the internal DRAM banks can significantly vary up to some finite maximum amount of time. If data is written to a particular address in one of the internal DRAM banks within the AMPIC and that same address is requested before the written data moves from the write cache into the actual DRAM bank location specified by the address, the old data (or stale data) currently stored at that address will be returned instead of the newly written data in the event that the read access to the DRAM bank should be granted before the write access.

Thus, it is desirable to have a method of guaranteeing that a read operation to a specific internal DRAM bank address returns the data that was last written to that particular address prior to the read operation; or to provide some means of returning information to the logic that generated the read request, stating that the data at the requested AMPIC device address is not up to date. The present invention addresses this need by novel data validation methods that thus enhance the performance and cache coherency of the AMPIC switching architecture.

In other types of digital systems, data validation mechanisms are used for microprocessor caching and for networking data transmission validation, but these mechanisms differ greatly in purpose and in implementation from the invention described in the present application for use with the AMPIC technology.

Designers of microprocessors have used memory caching techniques for some time, for example, to ease the bottleneck in processor performance between a processor and its memory. Basically, the processor keeps duplicate copies of smaller sections of what is in the main memory in a faster caching memory to improve performance. There is, however, the problem of keeping the duplicate copies of data up-to-date, or having the same value. Most caching algorithms focus on ensuring that when data is changed in the cache, the corresponding data in main memory is immediately updated (caching write-through schemes), or is marked as needing to be updated in the future ("dirty bit" caching schemes). This memory validation problem is much different from the data switching problem of the present invention in that one source, the microprocessor, controls the contents of the cache that it uses for main memory. For the AMPIC technology, of the invention, on the other hand, there are many sources and many caches that are controlled independently of one another and all used in conjunction to keep the data in the DRAM banks of the AMPIC devices up to date. Solving the problem of having many sources and caches for the AMPIC technology is therefore very different from the microprocessor caching techniques that have heretofore been developed for microprocessors.

Another area in which validation schemes have been previously used is in data link protocols for the transmission of data from a source to a destination in networking. These protocols are used to guarantee that the data received is actually the data sent. Most of these protocols allow only a limited number of packets to be transmitted until the receiver acknowledges correct reception of the packets. By including a sequence number, these protocols allow the receive side to identify the last correct packet that it received, indicating on which packet the transmitter should start sending again. By limiting the number of packets that the transmitter can have outstanding at one time to be less than the number of packets that can be identified by the sequence number, it can be guaranteed that both the transmitter and receiver can communicate which packets were lost and which need to be retransmitted. The most common of these data link layers is the "sliding window" protocol described, for example, in COMPUTER NETWORKS, $2^{nd}$ Edition, by Andrew S. Tanenbaum; pages 212–228, using such sequence numbers. While these data link protocols are designed to determine when packets were transmitted incorrectly from one to another across noisy data communication lines, they are not applicable to the validating of data retrieved from an AMPIC DRAM memory and the race condition that makes the validation scheme of the present invention, necessary. In the sliding window protocol moreover, the receiver passively waits to receive the next packets and determines what to do next when the packet comes in with its sequence number.

Quite differently, in the present invention, data is placed in AMPIC devices, informing the destination of the existence of this data, and enabling the destination then actively to fetch the data. In this invention, furthermore, specialized logic is provided in the AMPIC devices themselves to ensure that only valid data or appropriately marked invalid data is transmitted back to the destination source.

OBJECTS OF INVENTION

The primary object of the present invention, accordingly, is to provide a novel method of and apparatus for guaranteeing that only valid data is read out of a multi-port internally cached DRAM device (AMPIC), thereby eliminating any race condition in which stale data could potentially get read out of an AMPIC device before the desired data has actually been written into the appropriate internal AMPIC DRAM banks.

A further object is to provide such an apparatus that can avoid dead-lock situations that may arise when the AMPIC device can not identify and return valid data within some finite amount of time.

An additional object is to enable the scaling of the apparatus such that it is equally efficient with an array of AMPIC devices to validate data.

Other and further objects will be explained hereinafter and are more particularly delineated in the appended claims.

SUMMARY

In summary, from one of its broader aspects, the invention provides methods of guaranteeing that only valid data is read from a single multi-port internally cached DRAM device (AMPIC) or an array of such devices, where a plurality of system I/O resources read and write data into and out of an AMPIC device or devices through independent serial interfaces that contain caching to optimize the utilization of the shared internal DRAM banks.

More particularly, the invention embraces in a multi-port internally cached array of AMPIC DRAM devices in which a plurality of system I/O resources write and read data into and out of DRAM banks through independent serial interfaces and along shared internal data buses connected to corresponding DRAM banks in each unit of the array, a method, that comprises, checking the data stored at a particular address in a DRAM bank before reading out therefrom to a requesting system I/O resource, to guarantee against that data being stale, as from bus contention delays that have potentially prevented updated valid data from having been written into the bank before it is requested to read out, and upon such checking that the data is up-to-date, transferring such valid data to the requesting systemy I/O resource.

Preferred and best mode designs and techniques are hereinafter presented in detail.

DRAWINGS

The invention will now be described in connection with the accompanying drawings in which, FIG. 1 is an illustrative block diagram of the internal architecture of the AMPIC DRAM of said co-pending application, the operation of which is enhanced by the present invention;

PREFERRED EMBODIMENT(S) OF THE INVENTION

Figure 1:
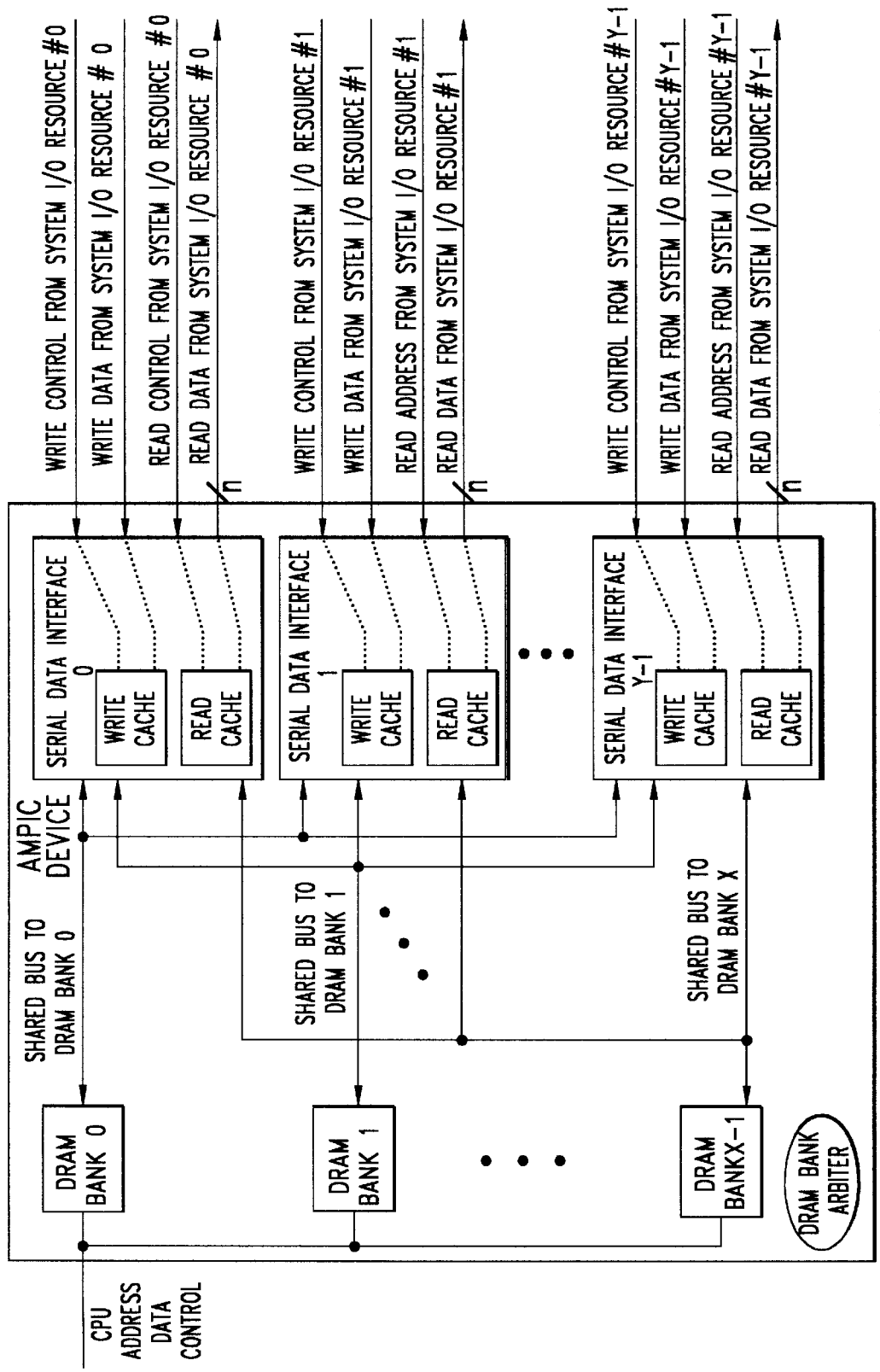

As previously noted, the basic structure provided by the AMPIC DRAM device of said co-pending application is illustrated in FIG. 1, providing a very high bandwidth connection between system I/O resources #O through #Y–1, applied at data ports or pins n to corresponding serial interfaces O through Y–1 to DRAM memory array banks O through X–1 located within the AMPIC DRAM device. The architecture illustrated in FIG. 1 is all-encompassing of the different AMPIC memory devices that can be created by varying the number X of DRAM banks, varying the number Y of serial interfaces, and varying the number 'n' of data pins per serial interface. In addition, the arrows showing the flow of data and control information into and out of each serial data interface O.Y—1 are intended to represent all combinations of serial interfaces which can provide the required data and control flows shown.

A system I/O resource for the purpose of the present invention refers to a block of logic that requires the ability to read and write data into an AMPIC device or a group of AMPIC devices. The AMPIC device shown in FIG. 1 provides a mechanism for transferring large amounts of data from one system I/O resource to another, granted that a source system I/O resource can inform a destination system I/O resource that is has placed data at a specific address inside of the AMPIC device for that destination system I/O resource. The AMPIC device contains 'x' internal DRAM banks each of which has 'k' number of memory locations in it, resulting in a total of 'x*k' memory locations to which variable sized data blocks can be read and written. The maximum allowable data size is fixed by the particular implementation of the AMPIC device. Each of the AMPIC memory addresses identifies a particular memory location in a particular internal DRAM bank, to which data can be written and read through all of the serial data interfaces shown in FIG. 1. All system I/O resources can read and write all of the AMPIC memory locations through the serial interface to which they are connected.

From the I/O resources, shown to the right of the AMPIC Device in FIG. 1, write control and write data busses connect with the right-hand inputs of the serial data interface and to the write cache of the interface, for example, from system I/O resource #O to serial data interface O. The read control bus is similarly applied to the interface O and to its read cache, which also connects to the read data bus of system I/O resource O. All the serial interfaces share a common bus to access Dram bank O. This shared bus is independent of the shared bus that all of the interfaces use to access DRAM bank 1, allowing different serial interfaces to be accessing the different DRAM banks at the same time. Overall, there are X–1 independent shared buses that the Y–1 serial interfaces use to access the X–1 DRAM banks.

The CPU port may have its own busses into each of the DRAM banks, as shown in FIG. 1, or it may also share the same busses that the serial interfaces must share to access the DRAM banks.

Thus, each system I/O resource has a write control bus and a write data bus connected to one of the AMPIC device serial interfaces to write data into the AMPIC device. To write a variable sized block of data into the AMPIC device, a system I/O resource sends an AMPIC address on its write control bus and the variable sized block of data on its write data bus. As the serial data interface on the AMPIC receives the address and data, it places such into the before-mentioned write cache of that serial data interface. After completing the current write operation into the serial data interface to which a particular system I/O resource is connected, it can immediately start writing another variable sized data burst to another AMPIC device address. As more data is written into the AMPIC on one serial data interface, the write cache may fill up faster than it can be emptied. To keep the write cache on each serial interface from overflowing, each serial interface has the means to stall (or temporarily stop) the current data write transfer until enough space has been freed up in the write cache to finish completing the current write transfer. The serial data interface signals the system I/O resource to stop sending data through the system I/O resource write control bus. As data is written into the write cache of each serial data interface, the serial data interfaces request access to 'x' internal DRAM banks in the AMPIC device.

The schematically represented DRAM bank arbiters (there being one arbiter for each DRAM bank) grant the different serial data interfaces access to the DRAM banks of the AMPIC device, allowing the serial data interfaces to move the data from the write cache into the proper memory location in the internal DRAM banks. The write caching is used in the serial data interfaces to help smooth over periods of contention when multiple serial data interfaces are attempting to write data into the same DRAM bank. When too many requests are outstanding to the same DRAM bank from the different serial interfaces, however, some of the serial interfaces are forced to stall the current write operations, as before-mentioned, in order to prevent their write caches from being overflowed.

In addition to the write control and data busses, as previously stated, each system I/O resource has a read control bus and a read data bus connected to one of the AMPIC device serial interfaces to read data from the ANIPIC device. When a system I/O resource wants to read the variable sized data block located at a particular AMPIC address, it writes the address into the AMPIC serial data interface to which it connects on its read control bus. The serial data interface on the AMPIC places the address in the read cache until it can gain control of the internal DRAM bank in which the data is stored and read it out. After retrieving the data, the serial data interface transmits the variable sized data block back to the system I/O resource. Because of the uncertainty of the delay in reading data from an AMPIC address, the AMPIC device is designed such that data from several addresses can be requested and stored in the read cache before the first variable sized data block is fetched and returned. This allows multiple blocks of data to be requested and retrieved out of the DRAM banks at the same time. The AMPIC, however, preserves the order that the addresses were inserted and will only transmit the data retrieved back to the system I/O resource in that order.

Figure 2:
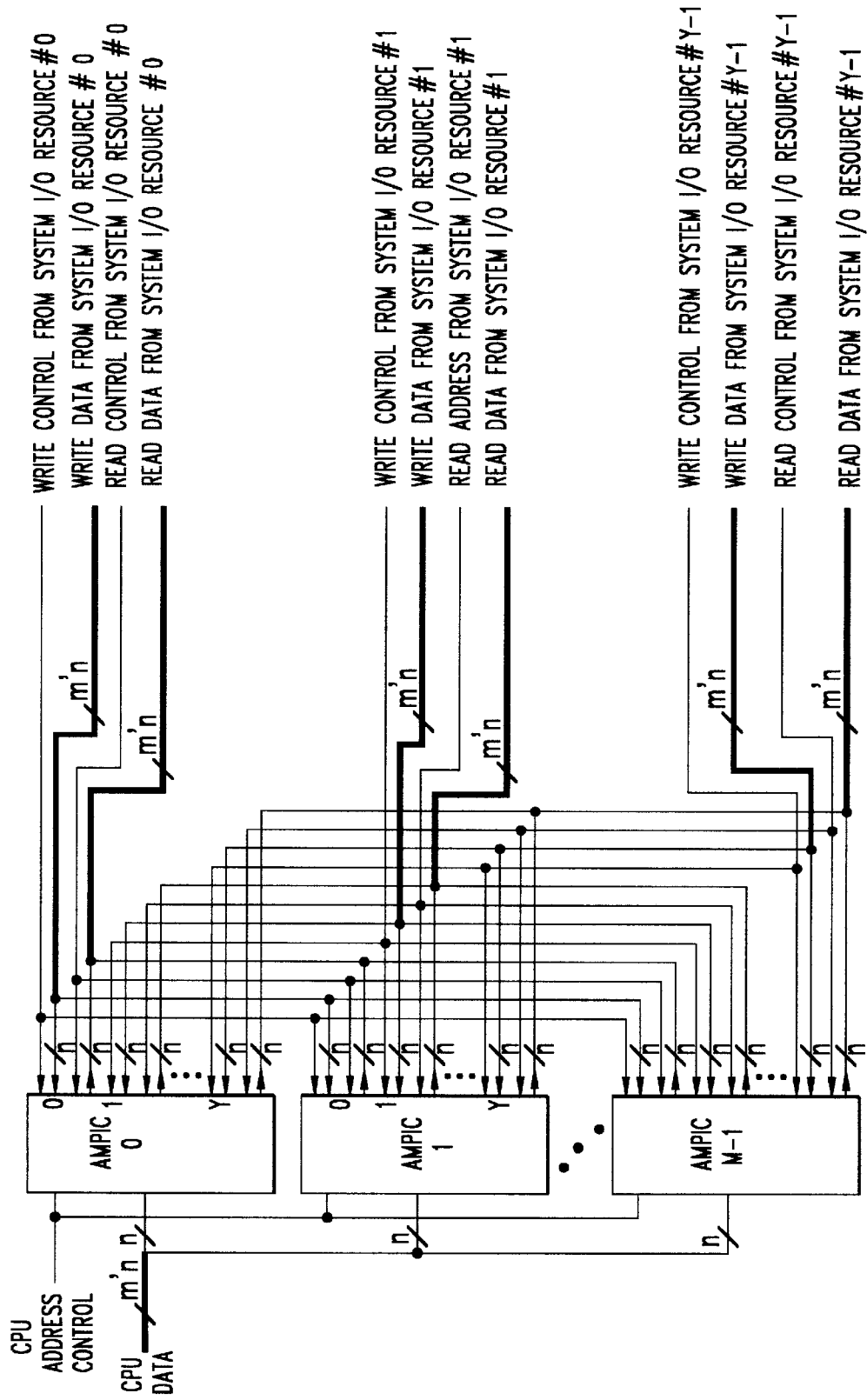
FIG. 2 is a block diagram of an illustrative system architecture based on the AMPIC DRAM of FIG. 1.

The flexibility of the AMPIC device is further enhanced by its ability to 'stack' multiple AMPIC devices into an array of AMPIC devices to create a much larger virtual AMPIC device, as illustrated in FIG. 2, showing AMPICs 0,1 . . . M—1, each of the type shown in FIG. 1. This makes it possible to scale the data buses from the array of AMPIC devices or virtual AMPIC device to m*n bits that attach to 'y' system I/O resources, where there are 'm' AMPIC devices used, each of which has 'n' bits of data on the serial interfaces to read and write information into the AMPIC devices. This increases the data rate at which data can be written into and read out of a single AMPIC device by 'm' times, and also increases the maximum amount of data that can be stored at each memory location to m times its size in a single AMPIC device. When multiple AMPIC devices are collected into an array of AMPIC devices and used as one large virtual AMPIC device, as shown in FIG. 2. all 'm' devices are clock cycle-synchronized, meaning that even though no control wires connect the AMPIC devices together, the 'm' AMPIC devices will stay perfectly synchronized because the exact same read and write accesses are performed on all 'm' AMPIC devices at the same time. It should also be observed that because the exact same read and write accesses are performed on all 'm' AMPIC devices at the same time, there are the same number of AMPIC addresses for a single AMPIC device as there are for a virtual AMPIC device. A number of AMPIC devices synchronized together is herein sometimes referred to either as an array of AMPIC devices or as a virtual AMPIC device; and discussion about a single AMPIC device also directly applies to a virtual AMPIC device and vice versa, because a virtual AMPIC device is simply multiple AMPIC devices working in parallel.

Since the serial interfaces share the same internal DRAM buses to the DRAM banks, as shown in FIG. 1, to put data into the DRAM banks and take it out, it is inevitable that contention will occur for these shared resources some statistical percent of the time, thus causing the time it takes to read or write data into and out of the internal DRAM banks inside the AMPIC memory to have a significant variance with some guaranteed upper bound. In an effort to alleviate the majority of this contention, extra buffering or caching is provided such that a few write accesses can be stored, as described above, before reaching the point of having to stall one of the external serial interfaces to one of the system I/O resources. By buffering a few write operations in the serial interface, the majority of times, that contention occurs, such is alleviated before having to stall any of the external serial data interfaces. Similarly, some level of caching is provided for the read accesses such that multiple read requests can be stored and handled simultaneously to the DRAM banks, reducing the chance that no data will be present to send to a particular system I/O resource.

Figure 3:
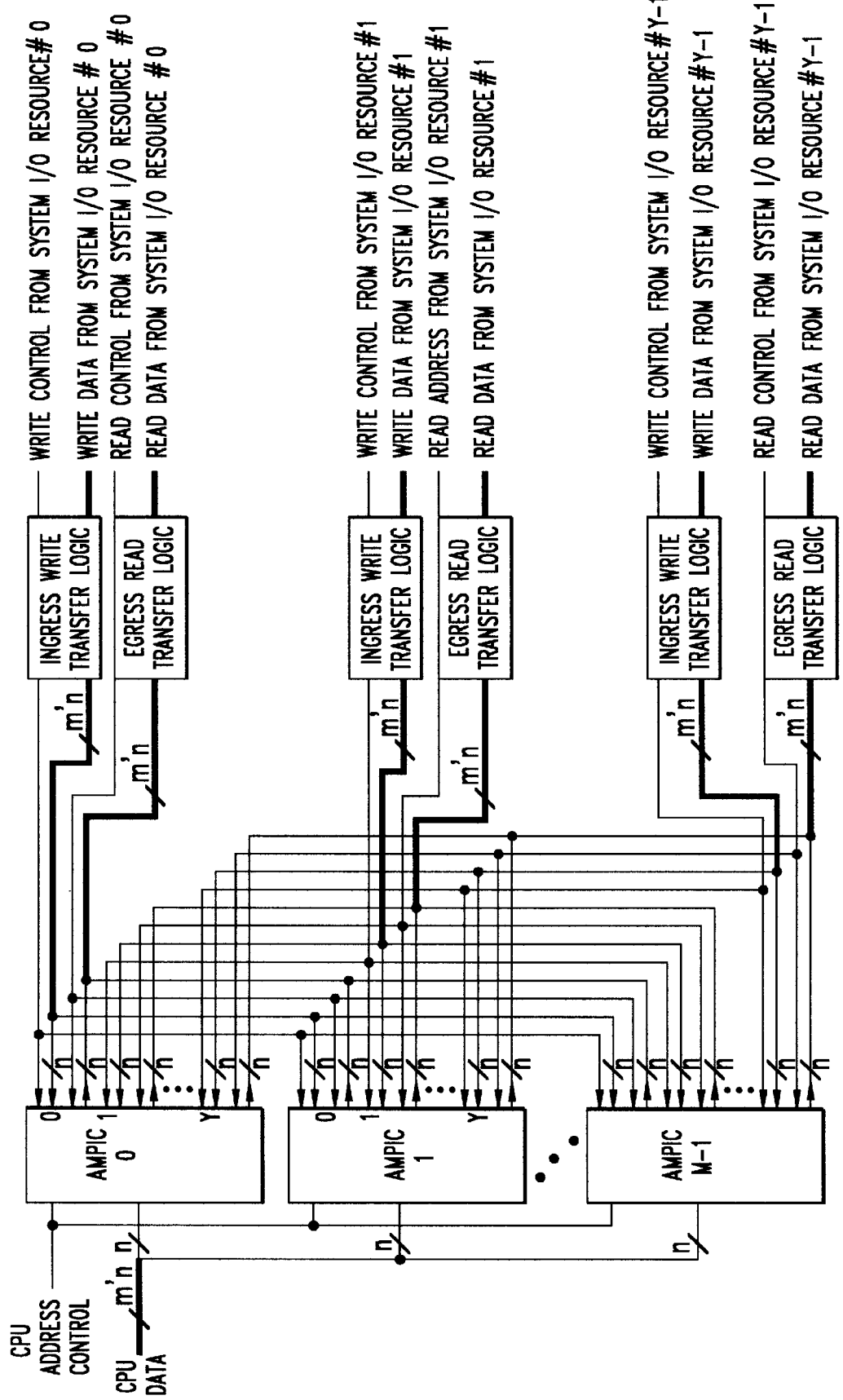
FIG. 3 illustrates a system in which a totally self contained AMPIC data validation scheme will not work.

This non-deterministic timing of the AMPIC device or virtual AMPIC device can potentially create a race condition where it becomes possible for the destination system I/O resource actually to request data before it has had time to be read out of a write cache data written into its destination internal AMPIC device DRAM bank. Although it is probably possible to implement some logic to stop the transmission of data that has been identified as being held up in one of the serial interface write caches, the logic required to check all the write caches for a particular address becomes a monstrous task when considering doing this for all requested addresses and for all serial ports, and in fast, orderly fashion. In addition, if there are any pipelined ingress write transfer blocks of logic, so-labeled in FIG. 3, and that might be required for a number of reasons, any data validation scheme entirely contained within a single AMPIC device or virtual AMPIC device will be inadequate because the AMPIC device will not be cognizant of the existence of the write operations in the ingress write transfer logic. An example of a system in which such ingress write transfer logic might be required is a system in which a set of backplane transceiver chips are required to send the write addresses and data across some type of high-speed serial interface before transferring the write information into the AMPIC device itself Any data validation scheme that is going to be successful for such a system, therefore, must start at the same place at which the address is chosen for where to place the data in the AMPIC.

Figure 4:
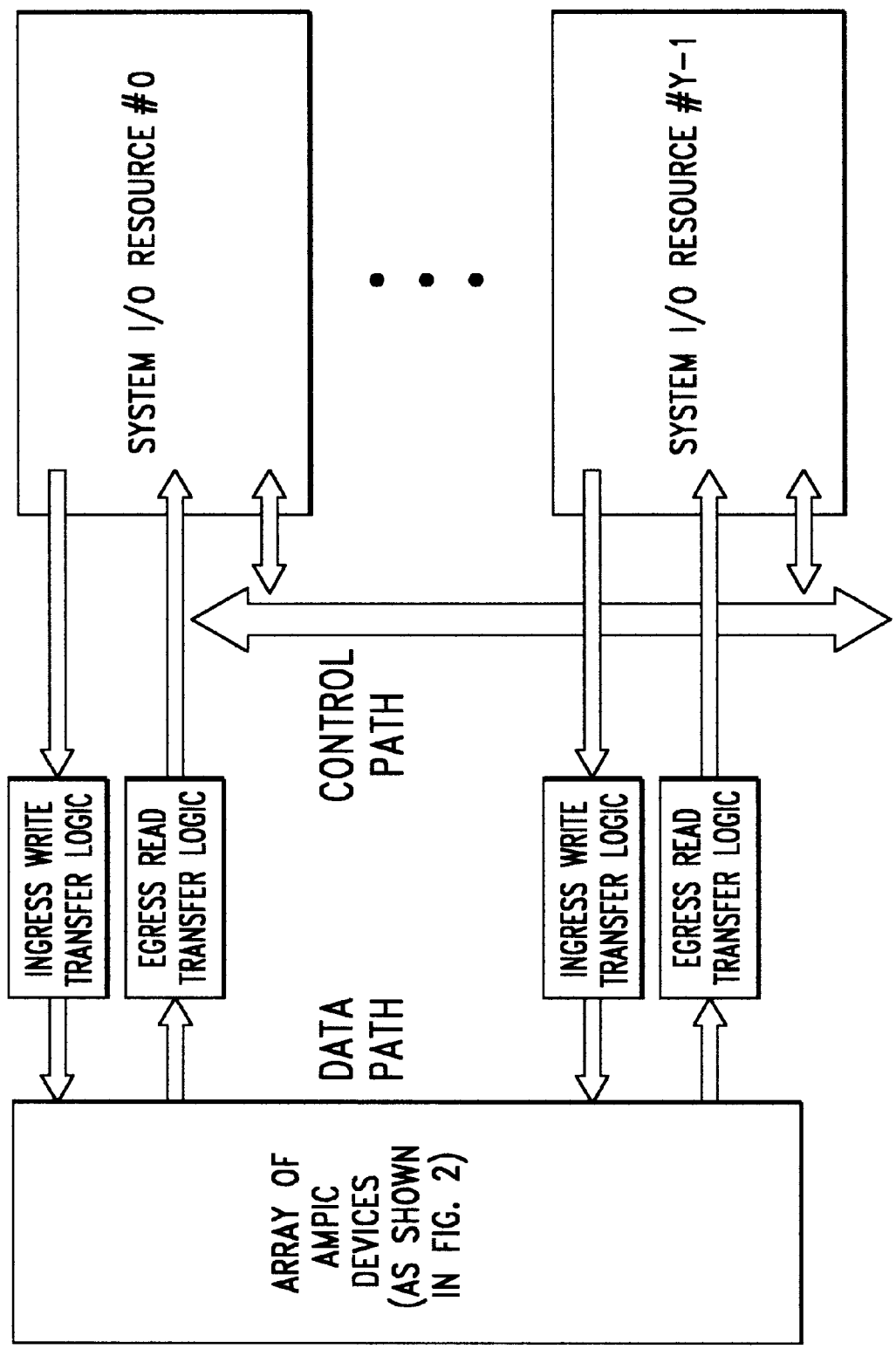
FIG. 4 shows one type of system with a separate control and data path that requires some system level data validation scheme.

FIG. 4, illustrates one such type of system that has a separate control and data path in which an array of AMPIC devices or a virtual AMPIC device is used, and for which a system data validation scheme will be required to ensure that valid data is read out of the AMPIC devices. It is possible, indeed, for addresses to circulate around the separate control path and get inserted into the AMPIC DRAM devices before the data for the addresses have been written into the internal DRAM AMPIC banks. One natural cause of this in such a system will be unusual statistical events in which a large number of addresses from different system I/O resources are all outstanding and contending to be read or written to the same single internal DRAM bank in the AMPIC device or virtual AMPIC device, which could potentially prevent data from being written into the bank before it is read out.

The novel apparatus and method of the invention can readily be implemented for guaranteeing that only valid data is read out of the multi-port internally cached DRAM memory (AMPIC device), and also providing for avoiding dead-lock situations that may arise when the AMPIC device or virtual AMPIC device can not identify and return valid data within some finite amount of time. Systems like the one shown in FIG. 4 can therefore be readily modified to provide that the system I/O resources are guaranteed to obtain correct data, or appropriately marked invalid data, when the system I/O resources read the data out of a single AMPIC device or a virtual AMPIC device in the system.

The invention works at the system level such that any amount of pipelined ingress write logic and any amount of pipelined egress read logic can be used without affecting the data validation scheme of the invention. The data validation scheme of the invention associates an extra bit, termed a "stale bit" herein, with each address location within an AMPIC device or virtual AMPIC device, and incorporates a new stale bit checking scheme into the architecture of the AMPIC device. By having the system I/O resources use the stale bit in the data validation method described below, the array of AMPIC devices within the system is able to ensure that only valid data, or properly marked invalid data, is read from the AMPIC devices by the system I/O resources.

Figure 5:
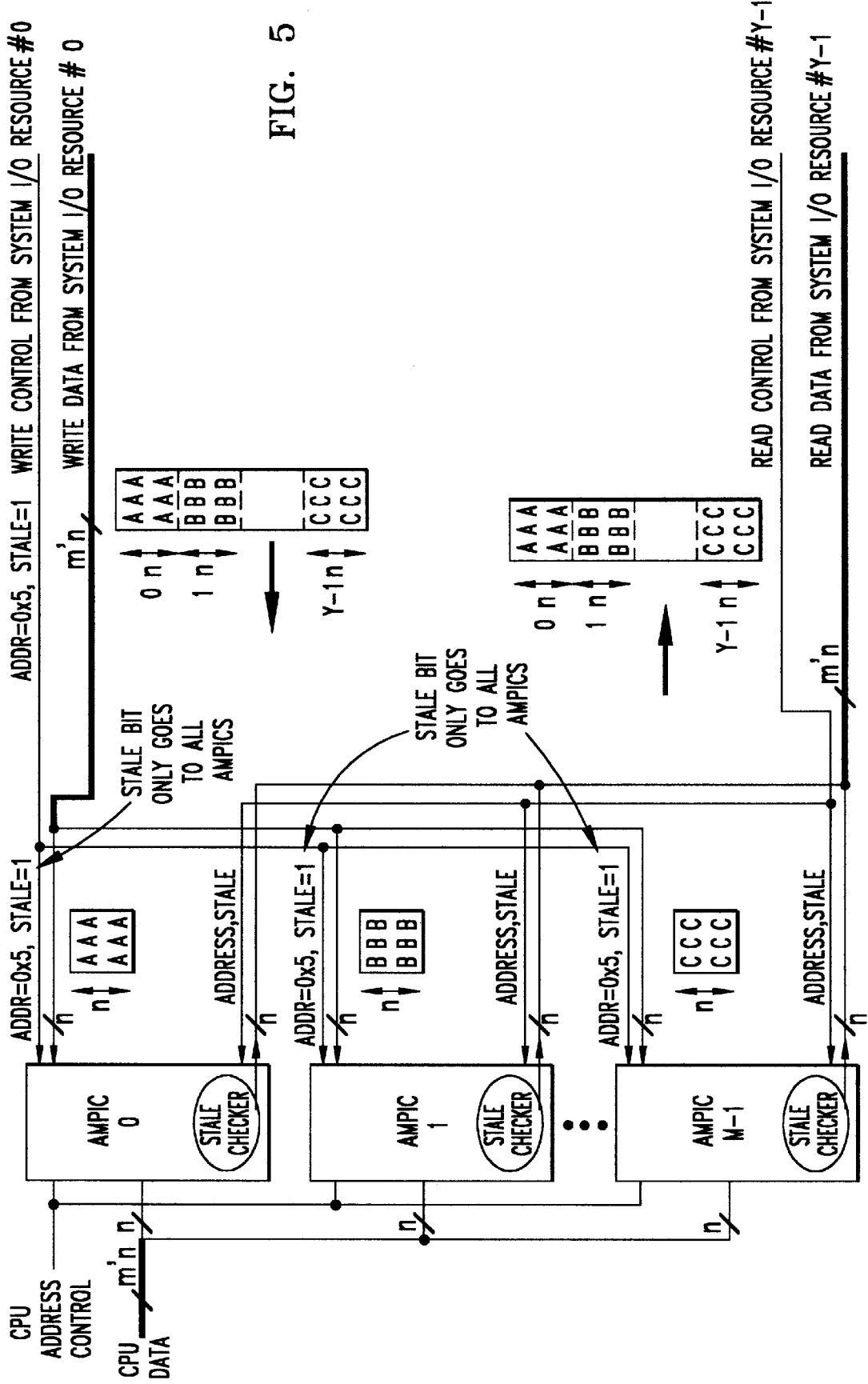
FIG. 5 illustrates how the stale bits are stored within all of the multi-port internally cached DRAM memory when the apparatus shown in FIG. 6 is used.

This data validation technique requires that the one extra bit be stored with the data at each address location within each AMPIC device contained within the array of AMPIC devices. FIG. 5 shows the details of how the extra or stale bit checking scheme is incorporated in each AMPIC device to ensure that valid data is retrieved correctly from a virtual AMPIC device. For simplicity and clarity, FIG. 5 only shows exemplary system I/O resource 0 write control, system I/O resource 0 write data, system I/O resource Y-1 read control, and system I/O resource Y-1 read data buses, instead of showing all the system I/O resource buses as in FIGS. 1 and 3.

The data validation technique of the invention requires that the system I/O resource know the state of the stale bit for an address which corresponds to a location in one of the internal DRAM banks before the system I/O resource writes data to that AMPIC address. While the details of how the system I/O resource maintains this information is later discussed, for present purposes of explanation, it is first assumed that all of the stale bit locations at all of the addresses in the AMPIC devices in the array are set to zero.

During a write operation, the system I/O resource must insert an address and a stale bit through its write control bus into the same serial interface on each of the AMPIC devices in the array of AMPIC devices, while the different bits of the data are distributed and written into different AMPIC devices in the array through the same system I/O resource write data bus. As the same address, the same stale bit and different data are received on the same serial interface on different AMPIC devices in the array, the address, stale bit and data are written into each AMPIC device serial interface write cache. The data is then moved into the appropriate internal DRAM bank after that serial interface has been granted control over that particular DRAM bank. It should be noted that this happens on the same serial interface on all the AMPIC devices contained in the virtual AMPIC device at the same time because all AMPIC devices in a virtual AMPIC device are always synchronized, as previously explained.

At some point after the write operation, a different system I/O resource or possibly the same, one may attempt to read the newly written data out of the virtual AMPIC device. The system I/O resource that wants to read the data, inserts the address and stale bit through its read control bus into all the AMPIC devices in the virtual AMPIC device. Each serial interface on the different AMPIC devices in the array, all performing the same action at the same time, write the address and stale bit into their read cache. When the serial interfaces of the virtual AMPIC device obtains access to the same internal DRAM bank in the virtual AMPIC device, the data is read out of the DRAM bank together with the written-in stale bit. If the stale bit inserted over the read control bus matches the stale-bit read out from the DRAM, all of the serial interfaces connected to the system I/O resource that read the address from the virtual AMPIC device transmit their section of the data back to that system I/O resource.

If the stale bits do not match the data read from the address, however, the address is read from the DRAM banks until the stale bits match, or until a fixed amount of time expires. If the fixed amount of time expires and the stale bits still do not match, the serial interface on the virtual AMPIC device connected to the requesting I/O resource will set an error bit in the data being transferred back so that the system I/O resource that requested the data will know that the data is not valid.

The specific example in FIG. 5 shows the address 0x5 and a stale bit of one being written through the system I/O resource 0 write control but into the serial interface 0 on all of the AMPIC devices in the virtual AMPIC device, while different bits of data AAA, BBB and CCC are written to the different AMPIC devices through the system I/O 0 write data bus. Serial interface 0 on all the AMPIC devices in the virtual AMPIC device then temporarily stores this data into its write cache until the serial interface obtains permission to write the data into the appropriate location in the appropriate DRAM bank.

In FIG. 5, furthermore, the system I/O resource Y-1 reads address 0x5 by inserting that address and a stale bit of one into the serial interface Y-1 on all of the AMPIC devices in the array 0, 1 ... M-1. The serial interface Y-1 on all of the AMPIC devices in the virtual AMPIC device then fetches its section of data from the internal DRAM bank specified by the address. In parallel, the serial interface Y-I on each AMPIC device in the virtual AMPIC device uses the stale checking logic to compare the stale bit inserted for the read access with the one that was read out of the internal DRAM bank location. If the stale bits match, the data is sent out on the Y-1 serial interface on all the AMPIC devices in the virtual AMPIC device to system I/O resource Y-I that read it. If the stale bits do not match, the data has not been placed in the AMPIC DRAM bank yet, and all of the of Y-1 serial interfaces on the AMPIC devices will fetch the data from that address location again and compare the stale bits again. This process continues until a data value is fetched that has a stale bit that matches the stale bit that was inserted on the read control serial interface, and the data from the address is sent to the system I/O resource that requested it. To avoid a dead-lock situation where the two stale bits may never match one other, each AMPIC read access is only allowed to be outstanding for a finite maximum predetermined amount of time. If that amount of time expires before the stale bits match, an error bit is set in the data that is passed back to the system I/O resource. This prevents the AMPIC devices from entering a dead-lock state when an error in the system occurs, and yet still provides the system I/O resource information so that it will not use invalid information.

Figure 6:
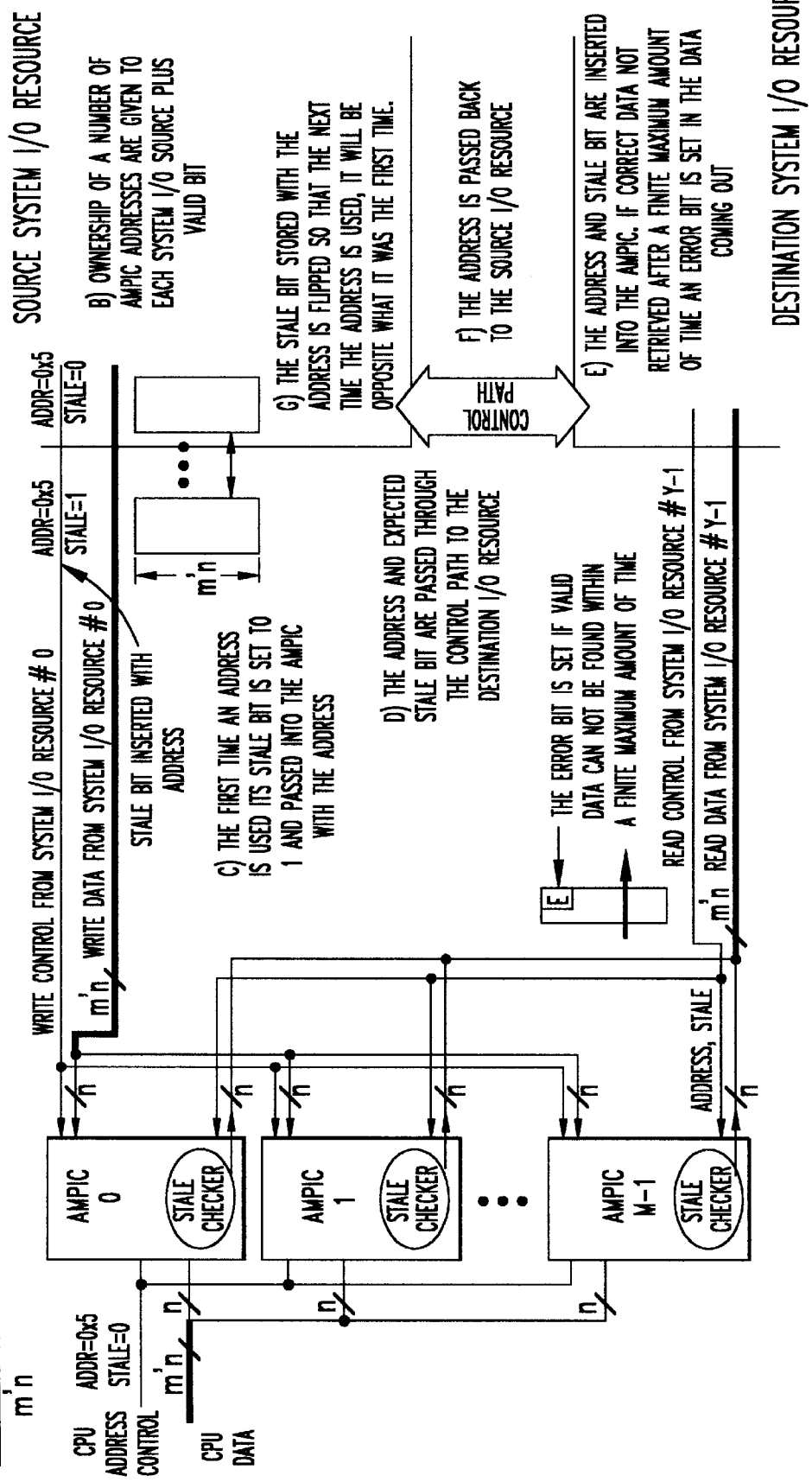
FIG. 6 illustrates the preferred apparatus for and method of providing a novel mechanism and technique for guaranteeing only valid data is read out of a multi-port internally cached DRAM memory device (AMPIC device), in accordance with the present invention.

FIG. 6 includes flow chart information "A"–"F" showing what must be done in the system for this data validation scheme to work properly. First, the stale bit located in the data at every address must be programmed to zero in all of the AMPIC devices in the array through the CPU control interface ("A"). This ensures that all of the system I/O resources know the state of all the stale bits for the addresses that they will use. Because the stale bit is inserted on the CPU control interface, it goes to all AMPIC devices in the system, not just one AMPIC device. After all the memory addresses have been initialized to have a stale bit of zero, a number of addresses are handed out to each of the system I/O resources along with the information that when the address is first used, a stale bit of 1 should be used with the addresses ("B"). When an address is used for the first time, the stale bit is set to one and is passed into all the AMPIC devices in the virtual AMPIC device with the address on the write control path ("C"). After completing the transfer, the source I/O resource sends a message to the destination I/O resource with the address and stale bit ("D"). The destination I/O resource takes and inserts both the address and stale bit into all of the AMPIC devices over its read control path ("E"). As described previously, the AMPIC devices will continue to fetch the data out of the particular memory location in one of the internal DRAM banks either until the stale bit inserted on the read control bus matches the stale bit stored with the data or until some finite amount of time has passed with no success. If the stale bits match, the data is sent back to the system I/O resource that requested the data. If, however, the stale bits never match, an error bit is set within the data that is returned to system I/O resource that requested it, allowing the system I/O resource to discard that data instead of using invalid data.

After the destination system I/O resource receives either the valid data, or the marked invalid data, it sends a message across the control path to the source system I/O resource saying that it is done with the address ("F"). The source system I/O resource then flips the stale bit associated with the returned address so that the next time it uses the address, it will know to use the opposite value for the stale bit ("G"). By flipping the value of the stale bit for a particular address each time a source I/O resource uses it, the AMPIC device internal stale checking logic can validate that data being sent to the system I/O resources is valid or invalid.

Figure 7:
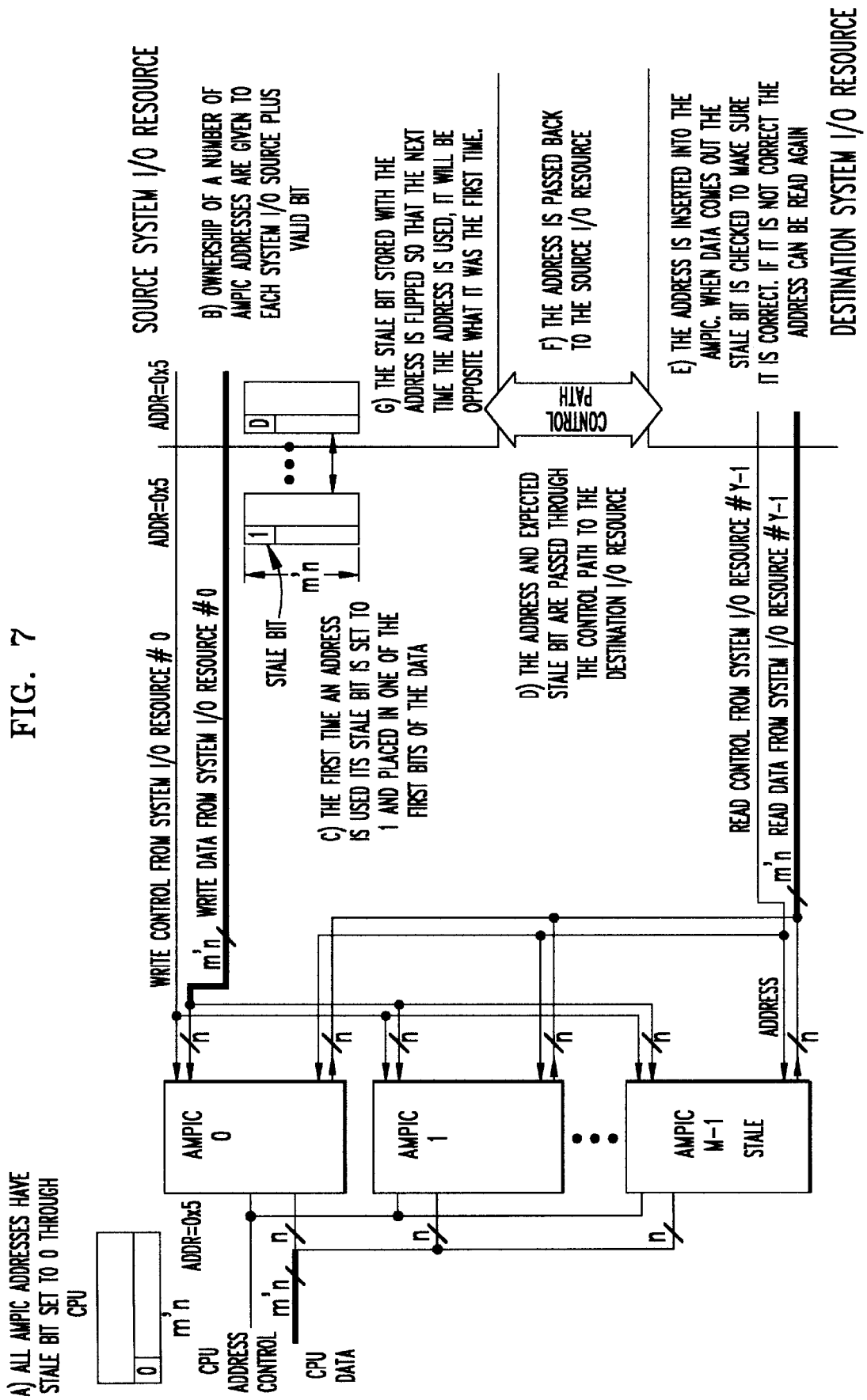
FIG. 7 illustrates a modification that, though not completely operating to guarantee only valid data read-out as in the system of FIG. 6, is still useful at least to identify the existence of stale or bad data.

A modification that, while not achieving all the verification and control features of the preferred system of FIG. 6, is useful at least to identify the existence of stale or old data, is presented in FIG. 7, it employs a stale bit with each address in the AMPIC memory device, and works at the system level to provide an easy means for determining if the data retrieved from a requested address is valid or not. To achieve this result, one bit must be set aside in the same place of the data at every address in the virtual AMPIC device. When the AMPIC memory first powers-up, the stale bit stored in the data at every address must be written to a zero through the AMPIC CPU interfaces ("A"). After writing the stale bit at every address to a zero, ownership of a number of addresses is given to each system I/O resource, along with the information that when the system I/O resource first uses each of the addresses, it should set the stale bit in the buffer to one ("B"). When a buffer is used for the first time, the stale bit put in the data is set to 1 ("C"), which is opposite to the setting of the stale bit of the data inside the AMPIC for that address. After transferring the data that contains the stale bit to the AMPIC devices in the virtual AMPIC device, the source system I/O resource then must send the destination I/O resource a message through the control path, stating that there is data available for it in a particular address with a stale bit of 1 ("D"). The destination system I/O resource can then retrieve the data by inserting the address into the AMPIC device or array of AMPIC devices ("E"). When the data from the address is returned to the destination system I/O resource from the virtual AMPIC device, the destination system I/O resource can compare the stale bit contained in the data with the one that was sent to it by the source system I/O resource. If the two stale bits match, the data is the correct data that was sent. If the stale bits do not match, it means that the ingress data had not been written into the appropriate internal AMPIC DRAM bank in the virtual AMPIC device by the time the address contents were requested by the destination I/O resource. If the destination I/O resource wants to try to get the correct data again, it can simply re-insert the address a second time in hopes that in the period of time since it received the incorrect data, the correct data was written into the internal DRAM bank in the AMPIC devices.

This process of comparing the stale bits after data is returned for the address can be iterated until the correct data is finally retrieved. After the destination I/O resource has either retrieved the correct data from the AMPIC devices or decided to give up re-requesting the data after a number of tries, the destination I/O resource sends the source I/O resource a message through the control path telling it that it can use the address again ("F"). The next time around, when the address is used again, the stale bit in the data written to the address will be set to O since the stale value in the AMPIC memory devices will now be one ("G"). By constantly flipping the stale bit each time of use of a particular AMPIC address, the stale bit always provides enough information to determine whether the data is the most current data, or the last data left over from the previous data transfer.

Figure 8:
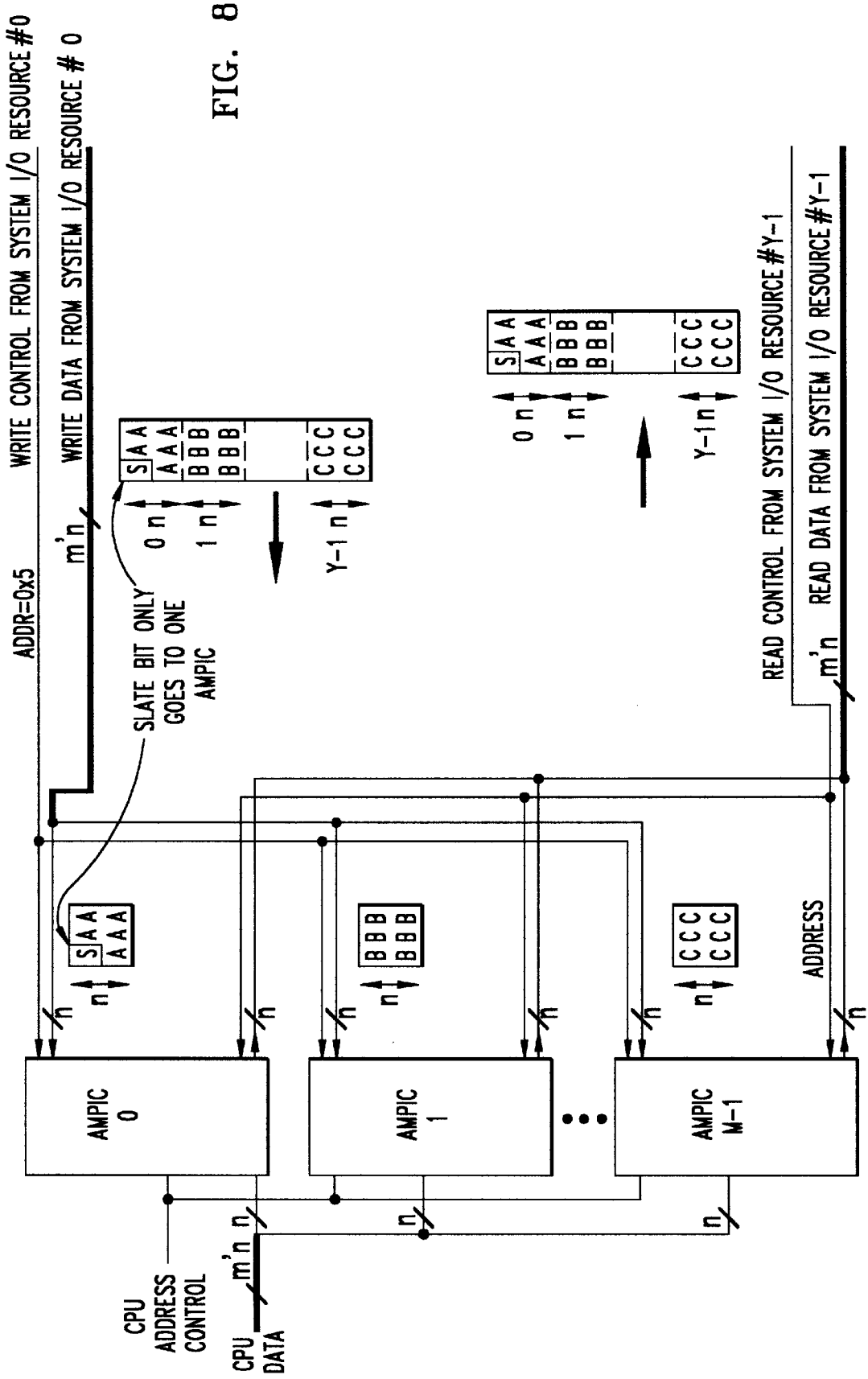
FIG. 8 illustrates where the stale bit is stored within the data in the AMPIC memory banks when using such modification that just identifies bad data read from AMPIC memories.

FIG. 8 makes clear that in this data validation method of FIG. 7, the stale bit actually resides in the data written to the AMPIC address and therefore only gets stored into one of the AMPIC devices in the virtual AMPIC device. This modified method of performing data validation can be used with a virtual AMPIC device that provides no internal stale checking scheme to create a system where all data read from AMPIC devices is validated before being used, providing a reliable method of ensuring that all data read out of the AMPIC devices is correct. There are, however, some downsides to performing the data validation in this manner. First and most importantly, in order to keep the system I/O resource egress pipes full, it is necessary to request data from multiple addresses before the data from the first address starts to come back. If the stale bit of the first data returned is incorrect, more data read from different addresses comes back from the array of AMPIC devices immediately after the bad data. Since the data was requested in a particular order and the source I/O resource wants that data in that order, the easiest thing to do is throw away all of the data that comes back after the stale mis-compare, and re-request all of it from the virtual AMPIC device again. Obviously, this drastically reduces the bandwidth utilization of each system I/O resource whenever there is a stale bit mis-compare, not only because time is wasted sending back a potentially large chunk of useless data, but since a few more addresses worth of data also had to be thrown out and re-requested. A second disadvantage in using this data validation method of FIGS. 7 and 8, as compared with the system of FIG. 6, is that the implementing logic required to do the stale bit compare and re-insertion of addresses that have invalid data returned is fairly complex when implementing it on the I/O resource, while the internal stale bit checking scheme of FIG. 6, implemented in the AMPIC devices themselves, is actually quite simple.

Further modifications will occur to those skilled in this art and such are considered to fall within the spirit and scope of the invention as defined in the appended claims.

What is claimed is:

1. In a multi-port internally cached array of AMPIC DRAM devices in which a plurality of system I/O resources write and read data into and out of DRAM banks through independent serial interfaces and along shared internal data buses connected to corresponding DRAM banks in each unit of the array, a method, that comprises, checking the data stored at a particular address in a DRAM bank before reading out therefrom to a requesting system I/O resource, to guarantee against that data being stale, as from bus contention delays that have potentially prevented updated valid data from having been written into the bank before it is requested to read out, and, upon such checking that the data is up-to-date, transferring such valid data to the requesting system I/O resource, wherein said checking is effected by writing and caching into the same serial interface on each of the AMPIC devices of the array, an address and an extra or stale bit, while different data bits are distributed and written into different banks through the same I/O resource; upon a system I/O resource thereupon requesting read out from a bank(s) by inserting said address and stale bit, simultaneously writing said address and stale bit into each serial interface of the different AMPIC devices of the array; reading the data out of the bank(s) together with the written-in stale bit; comparing the read and written-in stale bits to check for a match; and, upon obtaining such match, transferring to the requesting I/O resource the different data bits from the banks contributed by all of the serial interfaces, as valid data.

2. A method as claimed in claim 1 wherein, upon failing to determine that the data stored in the bank is up-to-date or otherwise valid during said checking, returning information to the requesting I/O resource that the data is not up-to-date.

3. A method as claimed in claim 1 wherein, in the event no match is obtained after a predetermined time interval of comparing, an error bit is inserted during the transferring to indicate invalid data.

4. A method as claimed in claim 1 wherein, in the event no match is obtained after a predetermined time interval of comparing, an indication of invalid data is provided.

5. A multi-port apparatus of an internally cached array of AMPIC DRAM devices having in combination, a plurality of system I/O resources provided with read, write and control buses for enabling reading and writing data into and out of a corresponding plurality of DRAM banks through respective independent serial interfaces, each provided with read and write caches, and thence along shared internal data buses connected to corresponding DRAM banks in each unit of the array, a digital circuit for checking the data stored at a particular address in a DRAM bank before reading out therefrom to a read-requesting system I/O resource, to guarantee against that data being stale, as from bus contention delays that have potentially prevented updated valid data from having been written along a write bus in the bank before it is requested to read out; and upon such checking that the data is validly up-to-date, means for transferring such valid data to the requesting system I/O source, wherein said checking digital circuit operates by writing along write buses into, and caching within, the same serial interface on each of the AMPIC devices of the array, an address and an extra or stale bit, while different data bits are distributed and written into different banks through the same I/O resource; and means is provided for enabling a system I/O resource thereupon to request along a read bus a read out from a bank(s) by inserting said address and stale bit and simultaneously writing said address and stale bit into each serial interface of the different AMPIC devices of the array, means for reading the data out of the bank(s) together with the written-in stale bit, and means for comparing the read and written-in stale bits to check for a match, and operable upon obtaining such match, for transferring to the requesting I/O resource the different data bits from the banks contributed by all of the serial interfaces, as valid data.

6. Apparatus as claimed in claim 5 wherein, upon failing to determine that the data stored in the bank is up-to-date or otherwise valid during said checking, means is provided for returning information to the requesting I/O resource that the data is not up-to-date.

7. Apparatus as claimed in claim 5 wherein, in the event no match is obtained after a predetermined time interval of comparing, means is provided for inserting an error bit during the transferring to indicate invalid data.

8. Apparatus as claimed in claim 5 wherein, in the event no match is obtained after a predetermined time interval of comparing, means is provided for indicating invalid data.

* * * * *